Oct. 20, 1942.　　P. R. GJERTSEN　　2,299,224
TOOL
Filed June 13, 1940
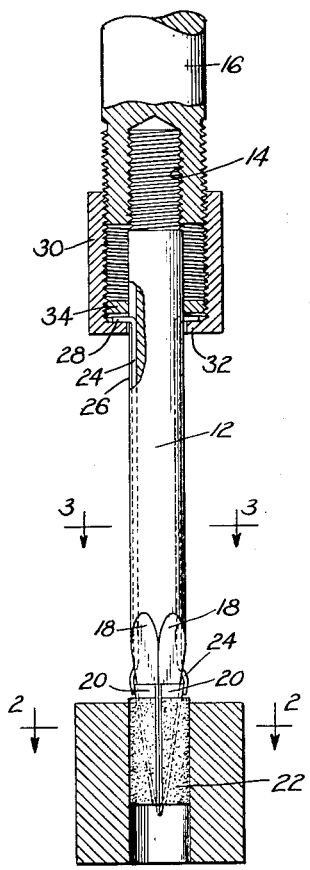
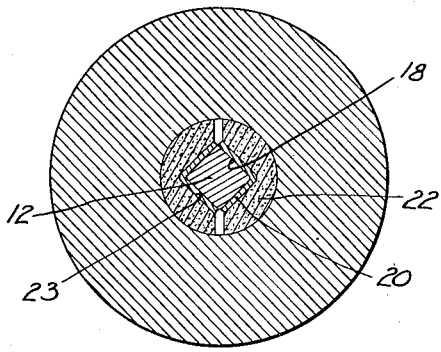
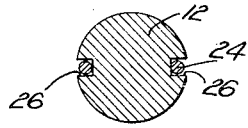
Inventor:
Paul R. Gjertsen
By:
Parker, Carlson, Pitzner & Hubbard
Attorneys Patented Oct. 20, 1942

2,299,224

UNITED STATES PATENT OFFICE 2,299,224

TOOL

Paul R. Gjertsen, Detroit, Mich., assignor to Ex-Cell-O Corporation, Detroit, Mich., a corporation of Michigan Application June 13, 1940, Serial No. 340,307

3 Claims. (Cl. 51—184.3)

The invention relates to a tool, and more particularly to a lapping or honing tool for use in finishing the inner surface of cylindrical members, and the subject matter of this invention is a continuation-in-part of my copending application Serial No. 188,593, filed February 4, 1938.

An object of the invention is to provide a new and improved tool having axially movable abrasive members associated with means operable as an incident to the axial movement of said members to move them radially to vary the outside diameter of the abrasive surface.

Another object of the invention is to provide a new and improved tool embodying a plurality of abrasive elements slidable longitudinally along tapered surfaces to effect a radial adjustment for varying the outside diameter of the working surface of the abrasive members.

Further objects of the invention are to provide a new and improved tool embodying, among other features, a novel form of abrading element and a novel form of supporting means for the abrading element, the element and the supporting means being arranged to be bonded together and the abrading unit thus formed being fashioned for operative association with coacting tapered surfaces.

Other objects and advantages of the invention will become apparent in the following description and from the accompanying drawing, in which:

Figure 1 is a side elevational view of a tool embodying the features of the invention, parts being broken away and in section.

Fig. 2 is a transverse sectional view through the tool on the line 2—2 of Fig. 1.

Fig. 3 is a transverse sectional view on the line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawing, the tool in the exemplary form which has been selected for illustrative purposes, includes a shank, mandrel or arbor 12 having one end thereof arranged to be operatively connected with a rotatable driving spindle or the like. Thus, in the present instance, the end of the shank is screw threaded, as at 14, to engage a socket 16 constituting an element adapted to be inserted in a suitable chuck or the like.

The opposite end of the shank 12 has an end portion arranged to be operatively engaged by the abrading unit. Thus the opposite end portion has a pointed form provided by four faces 18 equidistantly spaced circumferentially of the shank and angularly related to the shank axis. The faces 18 therefore taper to points which meet approximately on the axis of the shank at the extreme end thereof. As shown in Fig. 2, the faces 18 are related at right angles to each other, and this portion of the shank is therefore square in cross section. Carrier members or holders 20 for the abrasive elements are arranged for operative engagement with two adjacent tapered surfaces 18. Each carrier is preferably formed of sheet metal bent longitudinally and medially into a right angular cross sectional shape arranged snugly to embrace two adjacent surfaces 18. Each holder is of gradually diminishing width from one end to the other to present an apex on the holder having an angularity with respect to the plane of the side edges which is complemental to that of the corner between two of the surfaces 18. The holder supports an elongated abrasive element 22 having a semi-cylindrical cross sectional form. Medially of the flat face of the abrasive element is a longitudinal groove 23 of right angular cross section arranged to receive the holder, and the groove tapers on an angle which is complemental to that of the holder. The holder and the abrasive element are suitably bonded together.

As may be seen in Fig. 1, the holder is somewhat longer than the abrasive element bonded thereto and in assembly the larger end of the holder extends beyond the abrasive element. An elongated rod 24 is secured at one end to a projected part of the holder, for instance to the corner thereof (as shown). Grooves 26 are formed diametrically on the shank to extend longitudinally thereof substantially on the line of a corner between two of the tapering surfaces 18, and each of these grooves 26 receives the rod 24 on the holder associated with such surfaces. The rods preferably do not project beyond the outer periphery of the shank 12.

The free ends of the rods are bent at right angles, as indicated at 28, to provide short ends that in assembly with the shank extend outwardly and radially therefrom. A nut or collar 30 having external screw threaded engagement with the end of the socket has a radial flange 32. A disk 34, screw threaded into the nut or collar 30, is arranged to bind the ends 28 on the rods against the flange 32 on the nut. Adjustment of the nut 30 relative to the socket 16 will effect an axial movement which, through the rods 24, will move the abrasive units in an axial direction along the tapered portion of the shank. This movement will, because of the complemental surfaces, produce a radial movement of the abrasive unit to increase or decrease the outside diameter of the abrading surface thereon. It will be understood that in the present form abrasive units, each preferably comprising an abrading element bonded to a holder, are operatively assembled on two opposite sides of the shank.

Cross reference is hereby made to my copending application Serial No. 264,706, filed March 29, 1939, and matured as Patent No. 2,268,479, December 20, 1941, which covers the subject matter of invention generic to the two cases.

I claim as my invention:

1. A tool of the class described comprising, in combination, a shank provided with similar tapered surfaces disposed substantially at right angles to each other and terminating at one extreme end of the shank, sheet metal holders each bent to embrace two adjacent tapered surfaces and slidable longitudinally relative thereto, an abrasive member bonded to each of said holders, rods secured to said holders to extend longitudinally of said shank, said shank having longitudinal grooves in the outer periphery thereof to receive said rods, and means for moving said rods and holders longitudinally of said shank.

2. In an abrading element for a tool of the character described, the combination of an abrasive body having a cross sectional form which is substantially semi-cylindrical, the diametrical face of said body being longitudinally traversed by a medial tapering groove of substantially V-shaped contour, and a holder of substantially thin metal having a shape complemental to that of the grooved diametrical face of said body and rigidly secured thereto.

3. In a tool of the character described, in combination, a shank having flat surfaces terminating at one extreme end thereof, said surfaces being related substantially at right angles and tapering in width to meet substantially on the axis of said shank at said end, abrasive means having a groove therein fashioned complemental in shape and taper to two adjacent tapered surfaces, a holder complemental to the shape of said groove and of said adjacent tapered surfaces on said shank and adapted to fit between said abrasive means and said shank, said holder being bonded to said abrasive means, and means connected with said holder for slidably moving said abrasive means along said tapered portions of said shank.

PAUL R. GJERTSEN.